US008646091B2

(12) United States Patent
O'Connor et al.

(10) Patent No.: US 8,646,091 B2
(45) Date of Patent: Feb. 4, 2014

(54) DIGITAL SOFTWARE LICENSE PROCUREMENT

(75) Inventors: Clint O'Connor, Austin, TX (US); Douglas G. Macnair, Jr., Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 1415 days.

(21) Appl. No.: 12/125,231

(22) Filed: May 22, 2008

(65) Prior Publication Data
US 2009/0290716 A1  Nov. 26, 2009

(51) Int. Cl.
*H04L 29/06* (2006.01)
(52) U.S. Cl.
USPC .............................. 726/26; 713/158; 713/187
(58) Field of Classification Search
USPC ............................................ 380/278; 726/26
See application file for complete search history.

(56) References Cited

U.S. PATENT DOCUMENTS

| | | | |
|---|---|---|---|
| 4,658,093 A * | 4/1987 | Hellman | 705/52 |
| 6,721,793 B1 | 4/2004 | Corless | |
| 6,772,133 B1 | 8/2004 | Kambayashi et al. | |
| 6,885,999 B1 | 4/2005 | Corless | |
| 6,941,283 B2 | 9/2005 | Kambayashi et al. | |
| 7,076,468 B2 | 7/2006 | Hillegass et al. | |
| 7,080,385 B1 * | 7/2006 | Collison et al. | 719/318 |
| 7,103,574 B1 | 9/2006 | Peinado et al. | |
| 7,127,431 B2 | 10/2006 | Kambayashi et al. | |
| 7,200,760 B2 | 4/2007 | Riebe et al. | |
| 2004/0268120 A1 * | 12/2004 | Mirtal et al. | 713/156 |
| 2005/0044546 A1 * | 2/2005 | Niebling et al. | 717/177 |
| 2005/0102240 A1 * | 5/2005 | Misra et al. | 705/59 |
| 2005/0240533 A1 * | 10/2005 | Cutter et al. | 705/59 |
| 2006/0167814 A1 * | 7/2006 | Peinado et al. | 705/59 |
| 2007/0180496 A1 * | 8/2007 | Fransdonk | 726/3 |
| 2009/0161839 A1 * | 6/2009 | Neumann | 379/88.18 |

* cited by examiner

*Primary Examiner* — Mohammad L Rahman
(74) *Attorney, Agent, or Firm* — Haynes and Boone, LLP

(57) ABSTRACT

A digital software licensing system includes one or more subsystems to issue an order for one or more software licenses to a software vendor, receive from the vendor a wrapped license file, decrypt the wrapped license file using a manufacturer private key and verify authenticity of wrapped license file using a vendor public key. The wrapped license file includes a list of license keys which are signed using a vendor private key and encrypted using the manufacturer public key.

11 Claims, 3 Drawing Sheets

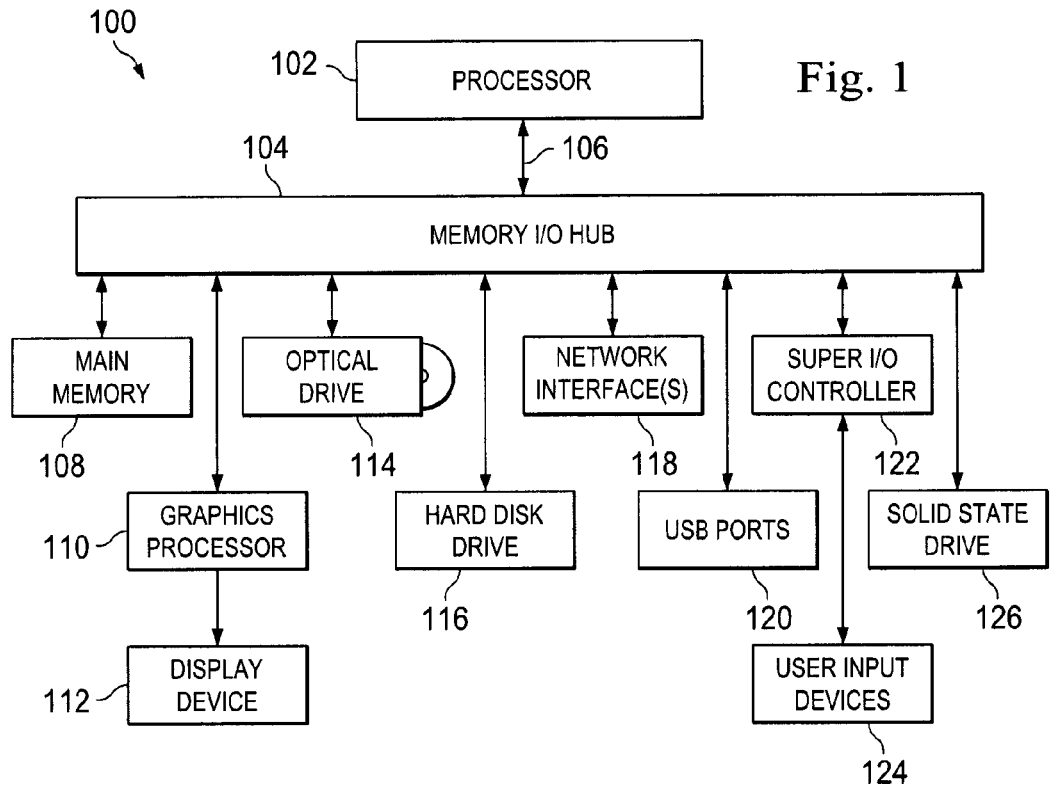

```
<xml_licfile>
    <encrypt e=MFG public key> (the contents are encrypted with MFG's public key)
        <vendor_name> XYZ SW, Inc </vendor_name>
        <MFG_po> 346944 </MFG_po>
        ... other procurement fields as needed
        <confirmation_code> RUT345 </confirmation_code>
        <license_count> 1000 </license_count>
        <sign s=Vendor private key> (the following list is signed with the vendor's private key)
            <license_list>
                <license> AAAAA-BBBBB-CCCCC-DDDDD-00000 </license>
                ...
                <license> AAAAA-BBBBB-CCCCC-DDDDD-00999 </license>
            </license_list>
        </sign>
    </encrypt>
</xml_licfile>
```

DIGITAL SOFTWARE LICENSE PROCUREMENT

BACKGROUND

The present disclosure relates generally to information handling systems, and more particularly to digital software license procurement.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Software vendors commonly require IHS manufacturers to purchase individual license keys and pay a royalty for the ability to install or use their software. Some software vendors require IHS manufacturers to purchase an expensive paper sticker, for which the IHS manufacturer pays a license fee. Software vendors also may require the IHS manufacturer to install special bits in the IHS basic input/output system (BIOS) to match the operating system (OS) media, with the license key stuck on the media, and provide generic activation bits on the hard drive. Such licensing systems are cumbersome and expensive to operate.

Accordingly, it would be desirable to provide an improved digital software license procurement absent the disadvantages discussed above.

SUMMARY

According to one embodiment, a digital software licensing system includes one or more subsystems to issue an order for one or more software licenses to a software vendor, receive from the vendor a wrapped license file, decrypt the wrapped license file using a manufacturer private key and verify authenticity of wrapped license file using a vendor public key. The wrapped license file includes a list of license keys which are signed using a vendor private key and encrypted using the manufacturer public key.

BRIEF DESCRIPTION OF THE DRAWINGS

FIG. 1 illustrates an embodiment of an information handling system (IHS).

FIG. 4 illustrates an embodiment of a sample xml licensing file concept.

DETAILED DESCRIPTION

Figure 2:
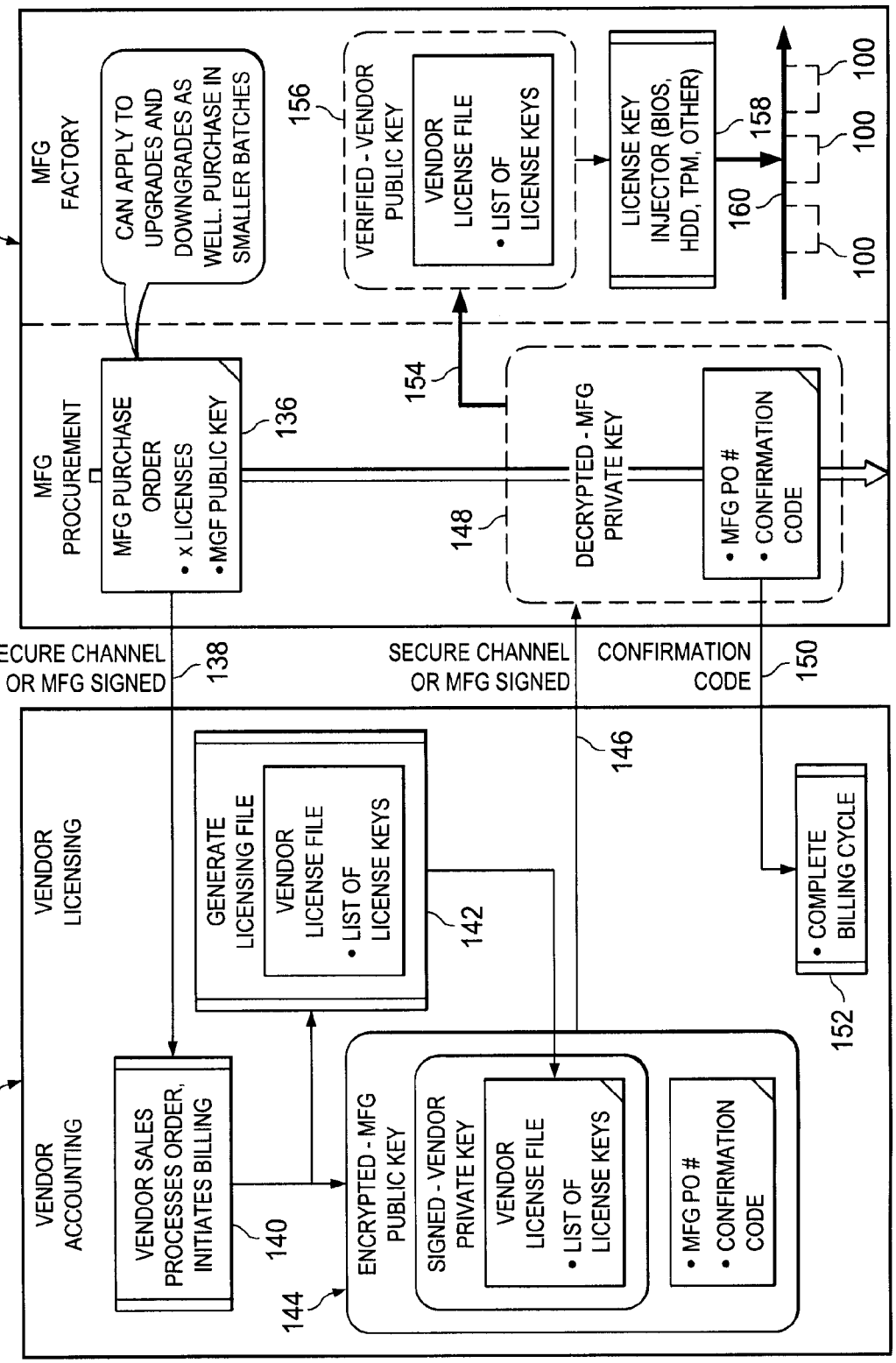
FIG. 2 illustrates a flowchart of an embodiment of a digital software license procurement.

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

FIG. 2 illustrates a flowchart of an embodiment of a digital software license procurement process 130. In this embodiment, the process 130 takes place between an IHS manufacturer 132 and a software vendor/licensor 134. However, it should be understood that this process 130 may be used for license transfer between any parties. Also, this embodiment is explained for transfers of information to take place between the manufacturer 132 and the vendor 134 using public-key type cryptography to secure the information. However, this process 130 may be used with any information security system or with no security system.

The process 130 begins at 136 where the manufacturer 132 generates a purchase order (PO) to request one or more license keys from the vendor 134. In an embodiment, the purchase order may apply to a purchase of "x" number of software licenses, software upgrades, software down grades, or a variety of other licenses. At 138, the manufacturer 132 transfers the purchase order to the vendor 134. The transfer 138 may take place via a network channel, such as the Internet, a wide area network, a local area network and/or a variety of other network channels for communicating information. In an embodiment, the channel may be a secure channel. In an embodiment, the manufacturer 132 may sign the information transferred 138 to the vendor 134 so that an encryption system may be used to secure the information transferred at 138. The vendor 134 receives the purchase order at 140 and may process the order and initiate billing for the order. Billing may be billed to the manufacturer 132 for the licenses to be received from the vendor 134 to the manufacturer 132. The vendor 134 may then generate a licensing file at 142. The vendor licensing file includes a list of license keys that may be used to validate use of the software, as should be readily understood by one having ordinary skill in the art.

Using a public-key type cryptographic security system at 144, the vendor 134, may create a wrapped license file. To create the wrapped license file, the vendor 134 may sign the vendor license file with a vendor private key. A manufacturer purchase order may be added to the signed vendor license file for identification purposes for the license keys. Additionally, a confirmation code may be added to the signed vendor license file allowing the simple confirmation of receipt of the license keys by the manufacturer 132. In an embodiment, the signed vendor license file, the manufacturer purchase order number and the confirmation code are "wrapped" together and encrypted using the manufacturer's public key. The wrapped license file at 144 is then transferred to the manufacturer 132 at 146. The manufacturer 132 may then decrypt the wrapped license file using the manufacturer's private key at 148. In addition, the manufacturer 132 may send a confirmation at 150 to the vendor 134 to confirm to the vendor 134 that the license file was received safely. The confirmation may include the manufacturer purchase order number and/or the confirmation code. Upon receipt of the confirmation 150, the vendor may then complete a billing cycle at 152 to bill or charge the manufacturer 132 for the purchased licenses. Returning now to block 148, the manufacturer 132 may send the license file to the manufacturer's factory at 154. Once received at the factory, the manufacturer 132 may verify the license file/the list of license keys using the vendor public key at 156. After verification at 156, the manufacturer 132 may upload or inject the license keys into one or more IHSs 100 at 158 using any system or method to inject the license keys to the IHSs 100. After the manufactured IHSs 100 are equipped with the software and corresponding license keys, the manufacturer 132 may then distribute the IHSs 100 at 160.

Figure 3:
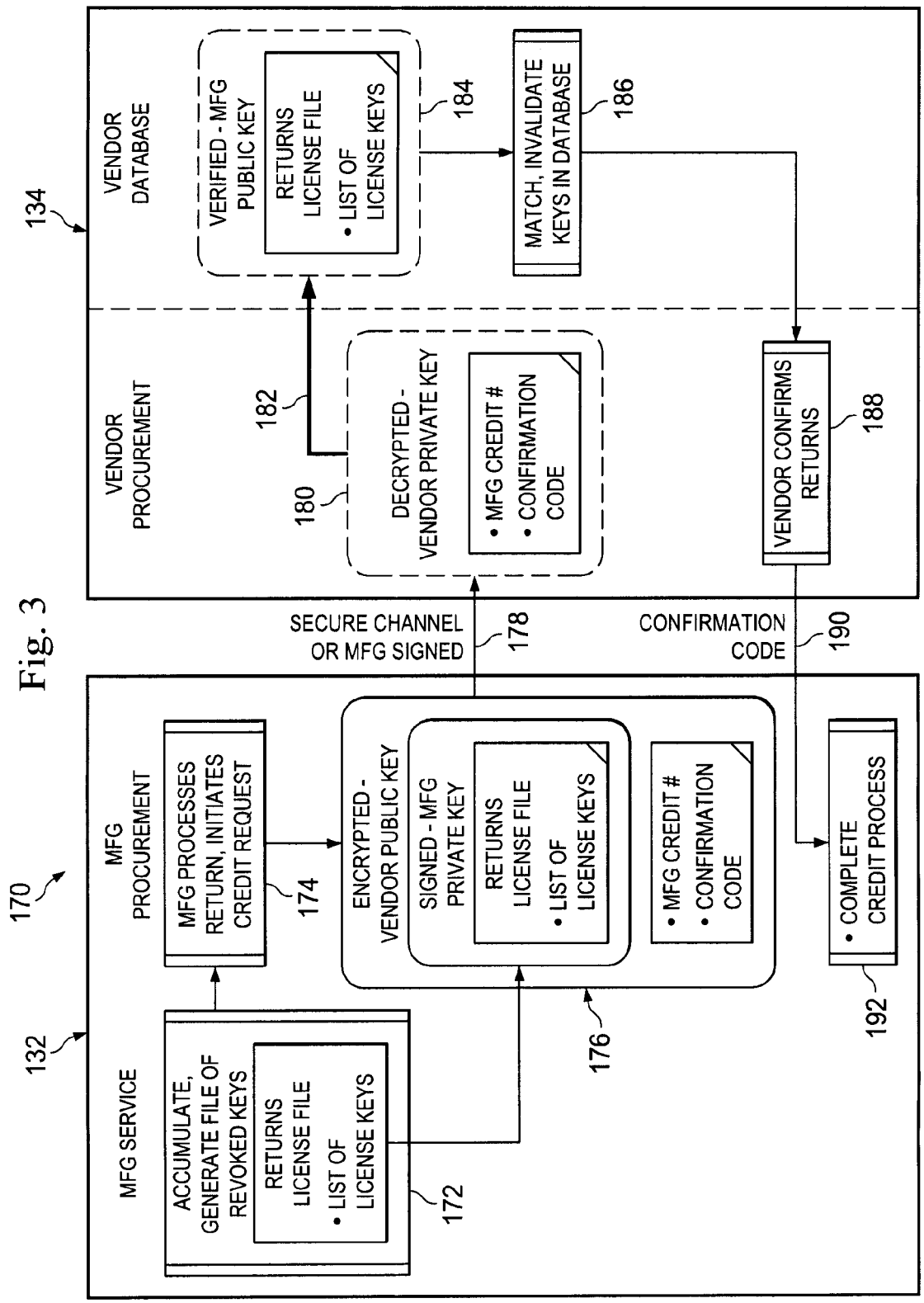
FIG. 3 illustrates a flowchart of an embodiment of digital software license return.

FIG. 3 illustrates a flowchart of an embodiment of digital software license return system 170. In an embodiment, the manufacturer 132 accumulates or generates a list of revoked, returned, or otherwise unused license keys to create a returns license file at 172, for which the manufacturer 132 desires credit from the vendor 134. The returns license file may be used at 174 to allow the manufacturer 132 to initiate a credit request at 172 to request the credit for the license keys in the returns license file. Additionally, the manufacturer 132 may sign the returns license file using the manufacturer private key for authentication and security. In an embodiment, the signed returns license file is combined with a manufacturer credit number and a confirmation code and encrypted using the vendor public key for security. This combined and encrypted file is referred to as a wrapped return file at 176. The wrapped return file is transferred from the manufacturer 132 to the vendor 134 at 178. Upon receipt, the vendor 134 may decrypt the wrapped return file at 180. The list of license keys from the wrapped return file is then checked at 182 with the vendor 134 database to verify/authenticate that the returned license keys are genuine license keys at 184. The vendor 134 then matches and/or invalidates the license key in the vendor 134 database at 186 to prevent unauthorized use of the license key. In an embodiment, the vendor 134 then creates a return confirmation, including the manufacturer credit number and/or the confirmation code at 188 and sends the return confirmation to the manufacturer 132 at 190. The process 170 ends at 192 where the manufacturer receives the return credit and authorization from the vendor 134 and completes the credit process.

FIG. 4 illustrates an embodiment of a sample XML licensing file concept for the processes described above with respect to FIG. 2. It should be readily understood that this is simply an example for illustration purposes and other programming codes may be used to perform the processes described herein.

This disclosure describes a process for standardizing a procurement and licensing of unique digital software keys. This disclosure may be applied to the license key process for all software vendors to an IHS manufacturer.

In an embodiment, the processes disclosed use standard signing and encrypting processes known today to securely transfer digital license keys through standard procurement practices, at which point the license keys may be separated and transferred to the factory or original design manufacturer (ODM) for consumption (e.g., downloading to an IHS 100). Any method of consumption may be used with this disclosure.

As described above and shown in the Figs., the manufacturer 132 may issue a purchase order for x licenses and supplies in the manufacturer public key (or some other equivalent cryptographic key) to the vendor 134. The vendor 134 processes this purchase order and has their licensing/software department generate and sign a file of x license keys. The vendor 134 then wraps this with the referenced manufacturer 132 purchase order and a confirmation code (e.g. a delivery/acceptance confirmation). This file is encrypted with the manufacturer public key for security. This signed file is transmitted to the manufacturer procurement, which decrypts the file, using the manufacturer's private key, matches the purchase order, and if all is correct, sends the confirmation code back to complete the vendor billing. It is understood that other forms of encryption, including symmetric keys, could be utilized as well.

The signed license file is then sent to the factory or original design manufacturer, where it is verified and the keys are dispensed through an injection mechanism to the IHS 100. The injection mechanism is not described here, but could be BIOS, HDD bits, TPM, or other such mechanism as should be readily understood by one having ordinary skill in the art. In an embodiment, the transmissions are to be sent over a secure channel such as SSL. If the transmission medium is unsecured or further security is wanted/needed (such as retransmission to an ODM), additional cryptographic signing/encryption measures may be utilized.

In an embodiment, the processes remove the value from any paper license stickers because the manufacturer 132 has paid the license fee through the digital process. Consequently the manufacturer 132 should be able to print license stickers on demand in the factory and enable other inventory reduction and manufacturing efficiencies, such as not needing secure physical cage storage for the purchased license stickers.

As discussed above, license key returns follow a similar process, substantially in reverse of the procurement process.

Because there is not a physical sticker to remove and return when not used, the digital code may be reused (e.g., if the system has not left the factory) or if necessary returned to the vendor (for systems returned by the customer). The vendor 134 may allow a certain percentage of claimed returns unchallenged or can remove the returned code from their validation database if they employ such a mechanism.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A manufacturer information handling system (IHS), comprising:
   a processor;
   memory coupled to the processor; and
   a set of instructions stored in the memory and executable by the processor to:
   issue an order to a software license provider IHS over a network for a plurality of software licenses, the order including a manufacturer public key;
   receive from the software license provider IHS over the network a wrapped license file, the wrapped license file including a plurality of license keys, signed using a software license provider private key, and encrypted using the manufacturer public key;
   decrypt the wrapped license file using a manufacturer private key;
   verify authenticity of the wrapped license file using a software license provider public key and, in response, inject one of the plurality of license keys into a manufactured IHS, wherein the license key injected into the manufactured IHS is operable to allow the use of software located on the manufactured IHS;
   generate a return license file that includes at least one of the plurality of licenses that includes a revoked license, a returned license, an unused license, and combinations thereof;
   sign the return license file using the manufacturer private key;
   combine the signed returned license file with a manufacturer credit number and a confirmation code;
   encrypt the combined signed returned license file, manufacturer credit number, and confirmation code;
   send the encrypted and combined signed returned license file, manufacturer credit number, and confirmation code over the network to the software license provider IHS; and
   receive a return confirmation.

2. The IHS of claim 1, wherein the set of instructions stored in the memory are further executable by the processor to:
   inject each of the plurality of license keys into a respective manufactured information handling system (IHS).

3. The IHS of claim 2, further comprising:
   a distribution system coupled to the manufacturer IHS and operable to distribute each of the manufactured IHSs to an end user.

4. The IHS of claim 1, wherein the set of instructions stored in the memory are further executable by the processor to:
   send a confirmation code to the software license provider IHS over the network to confirm receipt of the wrapped license file.

5. The IHS of claim 1, wherein the order is communicated over the network via a secure channel.

6. The IHS of claim 1, wherein the wrapped license file is signed and communicated over the network via a secure channel.

7. A method to procure a digital software license, comprising:
   issuing an order for a plurality of software licenses to a software license provider information handling system (IHS) over a network, the order including a manufacturer public key;
   receiving from the software license provider IHS over the network a wrapped license file, the wrapped license file including a plurality of licensing keys, signed using a software license provider private key, and encrypted using the manufacturer public key;
   decrypting the wrapped license file using a manufacturer private key;
   verifying authenticity of the wrapped license file using a software license provider public key and, in response, injecting one of the plurality of license keys into a manufactured IHS, wherein the license key injected into the manufactured IHS is operable to allow the use of software located on the manufactured IHS;
   generating a return license file that includes at least one of the plurality of licenses that includes a revoked license, a returned license, an unused license, and combinations thereof;
   signing the return license file using the manufacturer private key;
   combining the signed returned license file with a manufacturer credit number and a confirmation code;
   encrypting the combined signed returned license file manufacturer credit number, and confirmation code;
   sending the encrypted and combined signed returned license file manufacturer credit number, and confirmation code over the network to the software license provider IHS; and
   receiving a return confirmation.

8. The method of claim 7, further comprising:
   injecting each of the plurality of license keys into a respective manufactured information handling system (IHS).

9. The method of claim 8, further comprising:
   distributing each of the respective IHSs to an end user.

10. The method of claim 7, further comprising:
    sending a confirmation code to the software license provider IHS over the network to confirm receipt of the wrapped license file.

11. The method of claim 7, wherein the order and the wrapped license file are communicated over the network via a secure channel.

* * * * *